(12) United States Patent
Geiger et al.

(10) Patent No.: US 6,394,030 B1
(45) Date of Patent: May 28, 2002

(54) BIRD FEEDER DEVICE

(76) Inventors: Gerard G. Geiger, N165 W19557 Partridge Path, Jackson, WI (US) 53037; Rudolph V. Vaclav, 2532 S. 90th St., West Allis, WI (US) 53227; Donald E. Vaclav, 14755 West Dakota St., New Berlin, WI (US) 53151

( * ) Notice: Subject to any disclaimer, the term of this patent is extended or adjusted under 35 U.S.C. 154(b) by 0 days.

(21) Appl. No.: 09/663,175

(22) Filed: Sep. 15, 2000

Related U.S. Application Data (63) Continuation of application No. 29/088,420, filed on May 22, 1998, now abandoned.

(51) Int. Cl.$^7$ .............................................. A01K 61/02
(52) U.S. Cl. ................................................... 119/57.8
(58) Field of Search ........................... 119/51.01, 52.2, 119/57.8, 57.9, 429, 438; 472/45

(56) References Cited

U.S. PATENT DOCUMENTS

| | | |
|---|---|---|
| D66,182 S | 12/1924 | George |
| D92,297 S | 5/1934 | Hanchett |
| D120,852 S | 6/1940 | Bishop |
| D140,175 S | 1/1945 | Hyde |
| 2,392,532 A | 1/1946 | Hyde |
| D192,925 S | 5/1962 | Kofsky et al. |
| 3,126,870 A | 3/1964 | Matthew |
| 3,226,113 A * | 12/1965 | Mercer et al. ................. 472/45 |
| 3,537,429 A | 11/1970 | Regan |
| 4,767,088 A * | 8/1988 | Fielder et al. ............. 119/57.9 |
| 4,960,275 A | 10/1990 | Magon |
| 5,022,346 A | 6/1991 | Robertson |
| 5,107,796 A | 4/1992 | Embrey |
| 5,165,364 A | 11/1992 | Horkey ...................... 119/57.8 |
| 5,195,460 A | 3/1993 | Loken |
| 5,215,040 A | 6/1993 | Lemley |
| 5,293,835 A * | 3/1994 | Shagoury ................... 119/57.9 |
| D352,575 S | 11/1994 | Bransky et al. |
| D361,172 S | 8/1995 | Gates |
| 5,467,736 A | 11/1995 | Reynolds |
| 5,632,230 A | 5/1997 | Dornetta |
| 5,634,430 A | 6/1997 | Brostowicz |
| 5,699,752 A | 12/1997 | Wilkins |
| 5,819,689 A | 10/1998 | Simon |
| D422,756 S | 11/2000 | Geiger et al. |

OTHER PUBLICATIONS

Popular Mechanics p. 173 Bird Cafe; D30–124 May 1950.
Deltagram p. 148 Bird Feeder; D30–124 Nov.–Dec. 1960.
House & Garden p. 114 Shrine for Birds Advertisement; D30–124 Jun. 1958.
Deltagram p. 20 Shrine Feeder (photo–bottom, right corner); D30–124 Jan.–Feb. 1960.
Duncraft catalog p. 4 #75701 Audubon Sheltered Classic feeder; D30–124 No date available at this time.
Plow & Hearth BlueBird Station; D30–124 1992.
Wildlife products catalog Cover page (drawing—middle, right side page) D30–124 Jan. 1990.

* cited by examiner

*Primary Examiner*—Charles T. Jordan
*Assistant Examiner*—Elizabeth Shaw
(74) *Attorney, Agent, or Firm*—Ryan Kromholz & Manion, S.C.

(57) ABSTRACT

A bird feeder device including of a carousel having a central hollow aperture which turns on a horizontal axle. Attached to the perimeter of the carousel is a plurality of rotors extending radially therefrom, each rotor having a feed receptacle located on each distal end. A roof-like structure may be installed over each feed receptacle.

8 Claims, 13 Drawing Sheets

BIRD FEEDER DEVICE

This application is a continuation of application Ser. No. 29/088,420, Filed May 22, 1998, now abandoned entitled Bird Feeder.

BACKGROUND OF THE INVENTION

This invention relates generally to bird feeders, and more particularly to a bird feeder having a central fulcrum and carousel having multiple radially extending rotors, each carrying a bowl feeder station. The carousel turns on the central fulcrum in response to the out of balance weight shift of feeding birds as they move from station to station. In general, devices within the scope of the present invention include bird feeders that rotate freely about a central axis.

SUMMARY OF THE INVENTION

It is a major object of this invention to provide an attractive, whimsical, unpredictably sporadic, simple to assemble and use, bird feeding device that rotates in response to the out of balance weight, movement and momentum of feeding birds. Every component of the bird feeder device is custom designed to provide the aforementioned features. The majority of the components shown are molded from a UV resistant plastic and the support can be metal or plastic; however, it is conceivable that the components could be made out of any solid material such as wood, glass, metal, ceramic, cardboard, etc.

The device may be rotatably mounted through the use of a horizontal fulcrum or axle on any stationary object able to support the weight of the device when filled with bird feed and feeding birds. The device may be mounted indoors for the use of domesticated pet birds, or outdoors for wild birds. The vertical structural carousel of the feeder device turns about the horizontal fulcrum or axle, which is securely attached to a supporting structure. A household lubricant may be applied to reduce friction between the horizontal axle and the vertical structural carousel. Furthermore, a bearing may be added between the horizontal axle and the vertical structural carousel to further reduce friction. For example, a bronze oil-impregnated bearing can be pressed into the structural carousel's central bore during manufacture.

A motor or wind could also drive this device. For example, a series of cogs could be mounted on the backside of the carousel. Alternatively, a rotating axle, pulley, or sheaves may be utilized. For wind drive, it is within the scope of my invention to add a sail to the roof or side of each unit. A sail having the configuration of a pinwheel would allow the feeder device to rotate when facing oncoming wind.

The diameter of the vertical structural carousel is rather small in relation to the entire feeder device, yet its perimeter provides sufficient surface area for the placement of multiple large, long length, radial-extending rotors. The vertical carousel, although plastic, is structurally designed to handle varying loads applied through the rotors due to the suspending, pulling, twisting, and turning forces encountered from environmental conditions as well as the birds and the feed in the feeder stations. The overall sweeping curved shape of the rotors not only provides intrinsic value but further, provides greatly enhanced structural support to counter act all foreseeable forces encountered, i.e.; suspending, pulling, twisting, and turning forces from environmental conditions, the birds, and the feed in the feed receptacles of the feeder stations. The long length of the rotors embellishes and enhances the movement induced to the invention by the loads and forces transmitted by the landing, perching and flying off of the birds.

The radial extending rotors each attach at their arcuate ends to complementary arcuate pockets on the structural carousel. Each of the radial extending rotors terminates with a distal end, which integrally contain an apertured support area. The aperture of each distal end is of a size and shape compatible to receive and co-axially support a corresponding laterally extending axle snap pin on each feed receptacle which is a component of each feeder station.

Each feed receptacle may be self-supporting and self-retaining by the use of an attached integral axle snap pin. The axle snap pin of each feed receptacle is bifurcated defining a longitudinally extending slot which allow the leading. protruding snaps to inwardly spring to provide a bypass snap fit engagement of the apertured distal end of each rotor. The axle snap pin may be further provided with a radial flange to prevent inadvertent removal of the feed receptacle from the rotor aperture, once snap fit in place. Once again, a household lubricant may be applied to reduce the friction between the axle snap pin and the apertured support at the distal rotor end.

The feed receptacles are each provided with a cavity that may be of any shape. However, a generally rectangular shape is preferred with a rolled edge perimeter perch, designed to allow facile landing and perching of the feeding birds. The bottom surfaces of the feed receptacle cavities may be provided with small weep holes to allow for drainage of any accumulated moisture and help prevent the spoilage of feed. Each feed receptacle is spatially located lower than the level of its corresponding axle snap pin. Furthermore, the feed receptacle's "center of gravity" is also lower relative to the axle snap pin, which keeps each cavity in a generally upright position as it turns or rocks on its own axle snap pin.

Alternatively, the feed receptacles may be provided with a mounting receptacle for receiving a block or any shape of a conglomerate of bird seed and/or any other type of food i.e., suet, lard, peanut butter, cracked corn, insects, meat, etc. It is conceivable that some or all of the feed receptacle cavities may also be filled with water or other fluids to provide drinking or bathing for the birds. In this instance, the weep holes would not be formed.

The individual feed receptacles may be further embellished with roof-like structures and/or decorated sides. A feed receptacle coupled to a roof-like structure forms a feeder station. The feeder stations turn, swing and teeter-totter simply by the out of balance weight, movement and momentum shift of the feeding birds. Again, the "center of gravity" of each feeder station is sufficiently low relative to the axle snap pin so that each station remains in a generally upright position. The feeder stations turn simultaneously but independently of the vertical structural carousel.

All the components simply slide and or snap together without the need for hand tools. They can be easily disassembled, by reversing the assembly procedure, grasping specific features intended for disassembly and pulling the components apart from each other. Furthermore, the whole device can be tailored to attract specific groups of people that have certain interests; i.e., people from different areas of the country may prefer different styles of architecture, and different races, cultures or religions may want the device embellished with certain shapes, symbols or figures.

DETAILED DESCRIPTION

Figure 1:
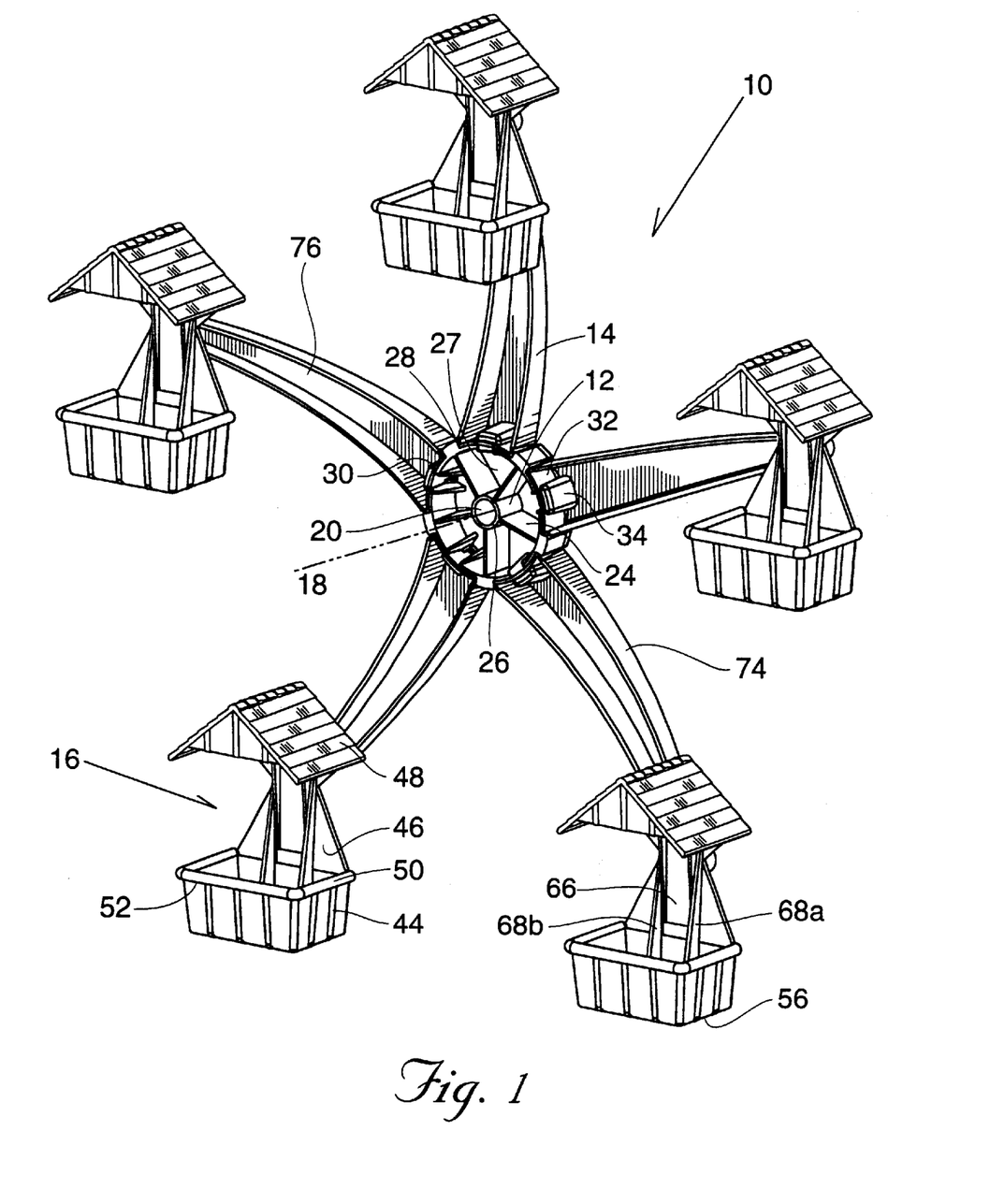
FIG. 1 is a perspective view of the bird feeder device.
Figure 2:
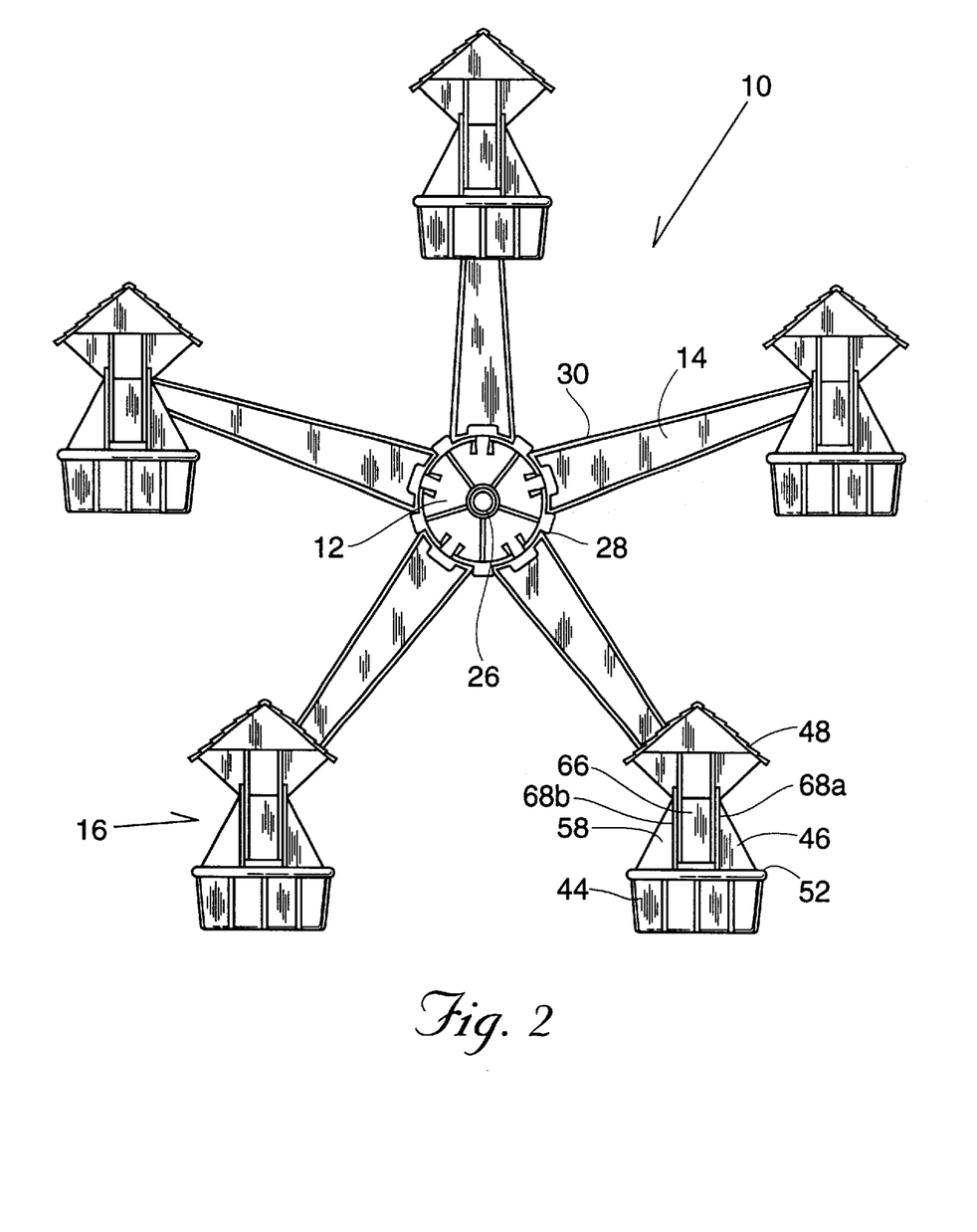
FIG. 2 is a front elevational view of the bird feeder device.
Figure 3:
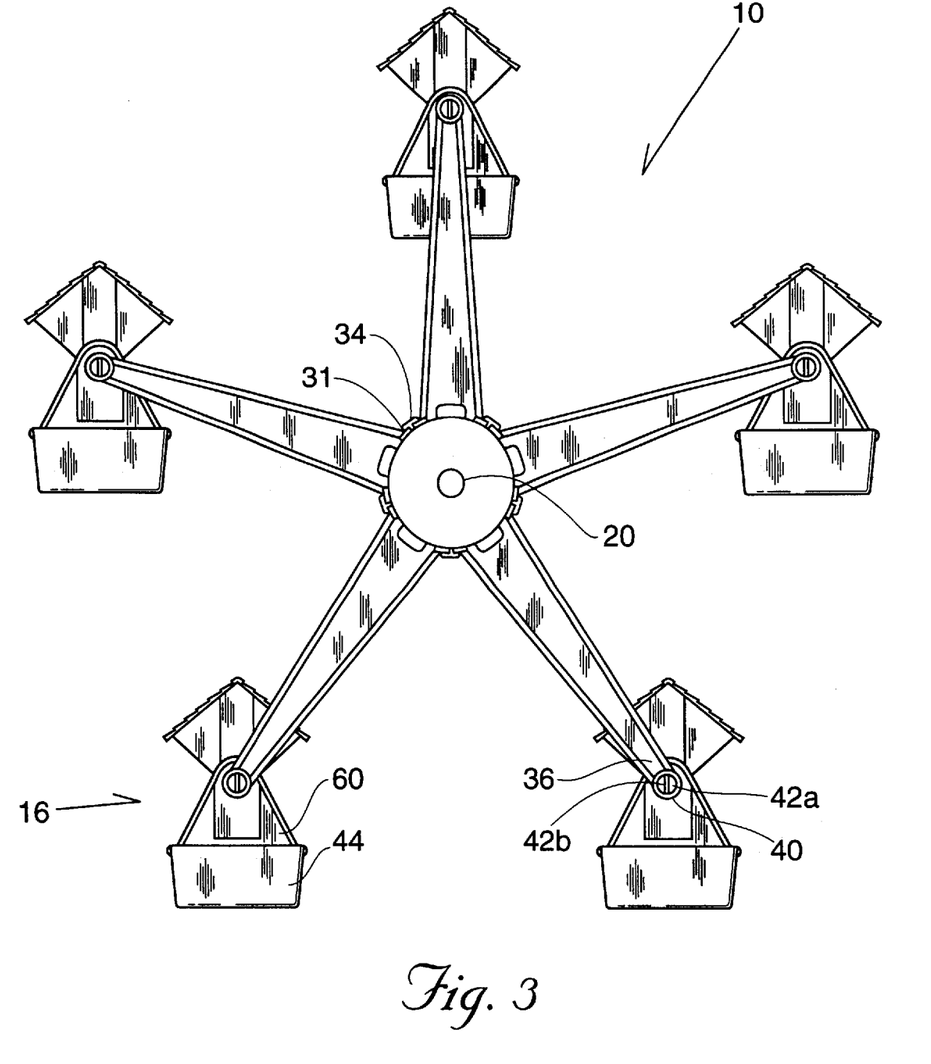
FIG. 3 is a rear elevational view of the bird feeder device.
Figure 4:
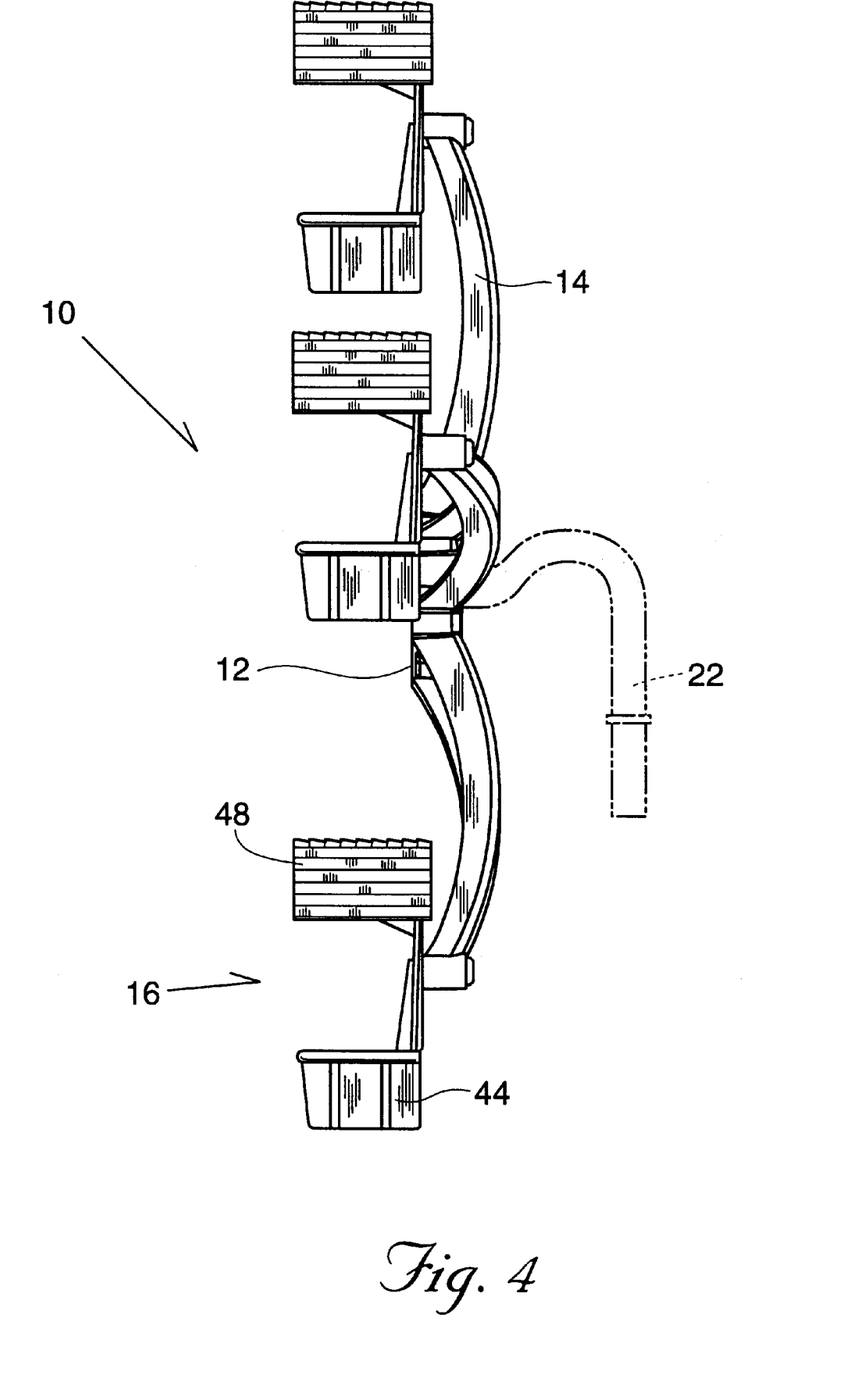
FIG. 4 is a side elevational view of the bird feeder device showing a vertical support transition to a horizontal support in phantom.

With reference to FIG. 1, the bird feeder device 10 includes a generally vertical structural carousel 12, a plurality of radial extending rotors 14, and a plurality of feeder stations 16. The vertical structural carousel 12 is mounted and turns about a horizontal fulcrum or aperture 20 about axis 18. The horizontal fulcrum 20 may be securely and rotationally attached to a support means 22 (shown in phantom in FIG. 4), which in turn may be mounted on any stationary object (not shown) that is sturdy enough to support the combined weight of the device 10 while filled with feed and supporting several birds.

Figure 20:
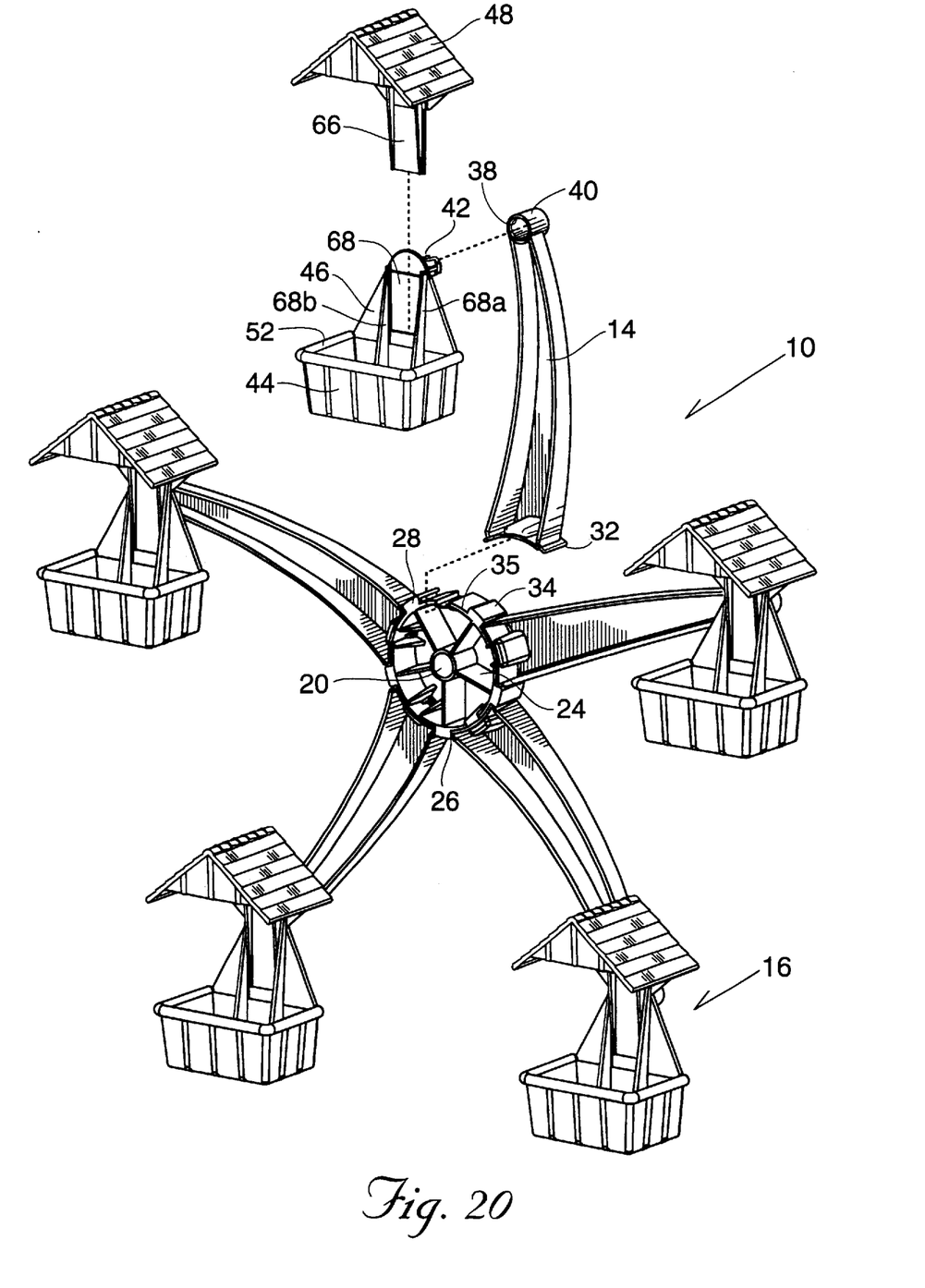
FIG. 20 is a perspective view of the bird feeder device showing one rotor, feed receptacle and roof-like structure in an exploded condition.

The diameter of the vertical structural carousel 12, while small in comparison to the overall diameter of the device, has a sufficient perimeter to allow the mounting of a plurality of radially extending rotors 14 thereon. Referring now to FIGS. 1 and 20, rigidity of the carousel 12 is accomplished by the use of several radial projecting gussets 24 from a central hollow bushing 26 along the back wall 27 of the carousel 12 to the outer ring 28 where the rotors 14 are attached.

Figure 10:
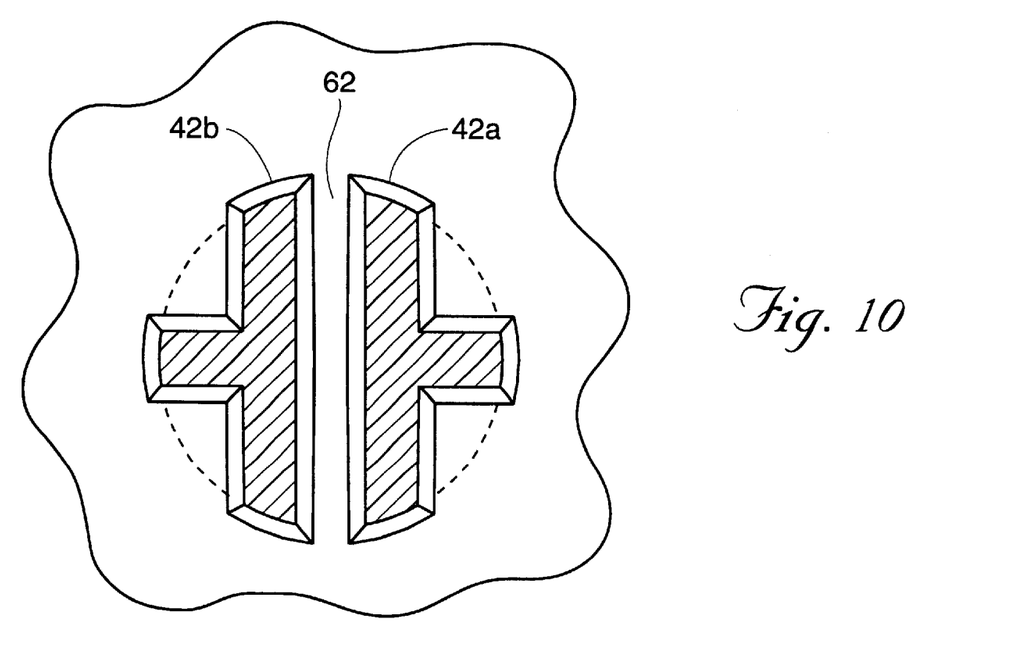
FIG. 10 is a sectional view of the axle snap pin taken along line 10—10 of FIG. 9.
Figure 17:
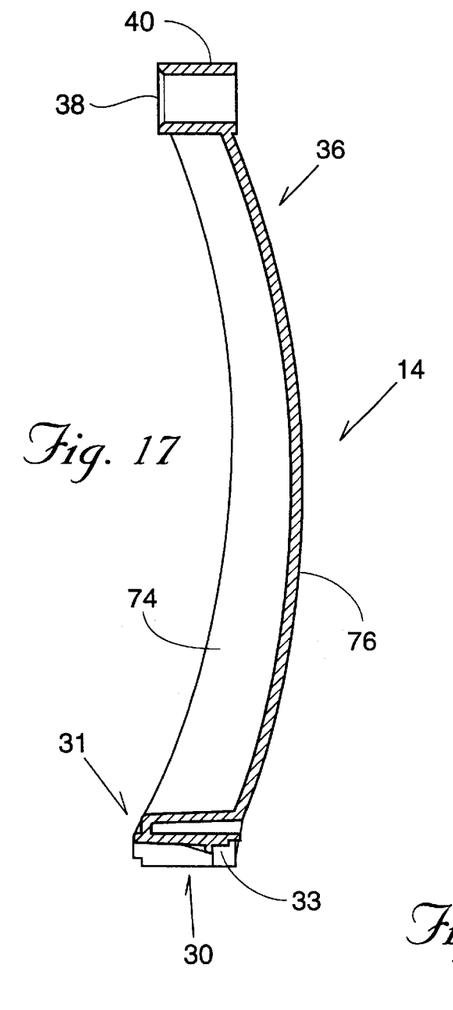
FIG. 17 is a sectional view of a rotor.
Figure 18:
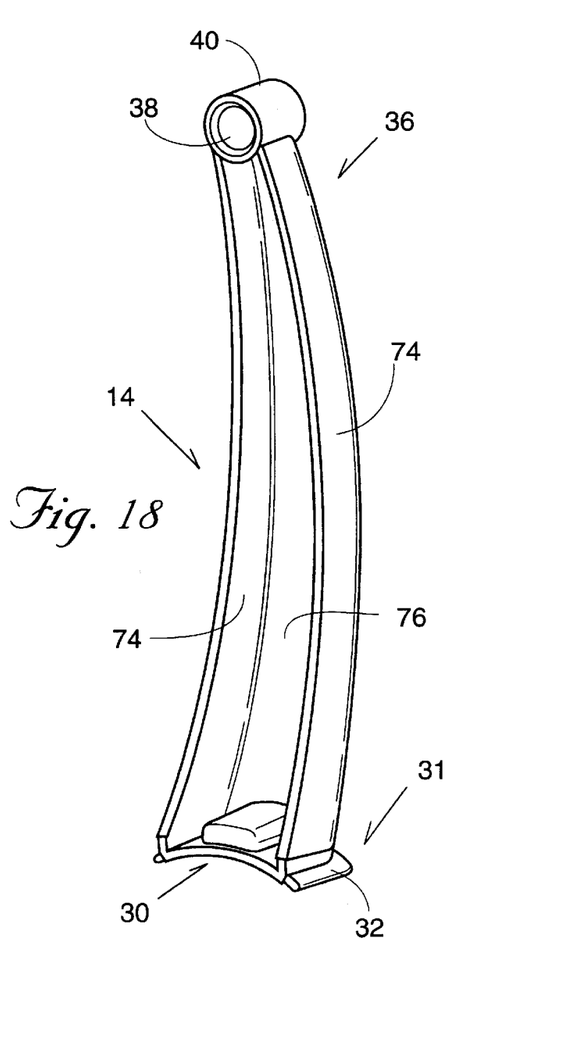
FIG. 18 is a perspective view of the rotor.
Figure 19:
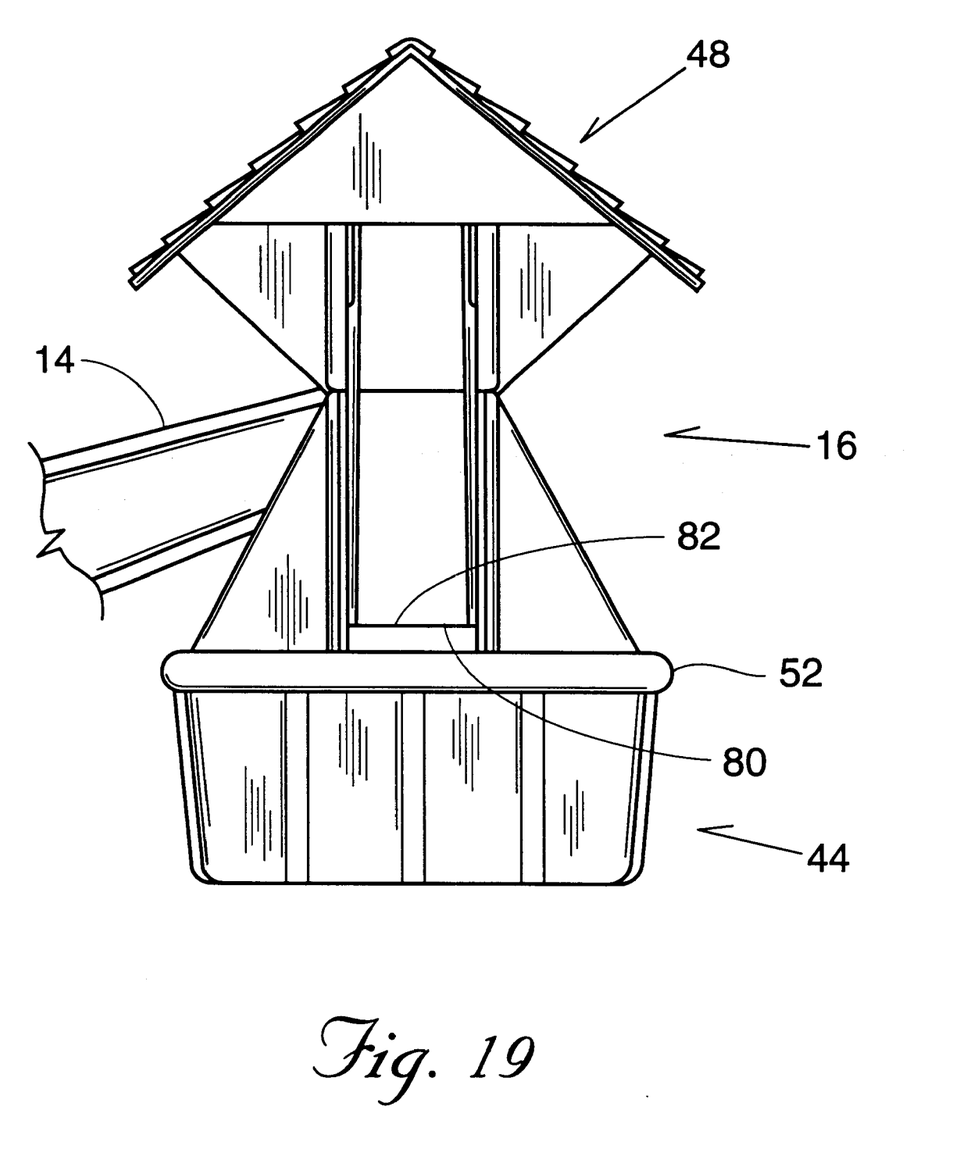
FIG. 19 is a front elevational view of a feeder station including the rotor, feed receptacle and roof-like structure attached thereto.

The rotors 14 are shown in FIGS. 17 and 18. Each rotor has a pair of opposed stiffening ribs 74 that extend between the elongate web member 76. Each rotor includes a first end 30 and a second end 36. As best seen in FIGS. 1 and 20, the radial extending rotors 14 are attached at end 30 to the outer ring 28 of the carousel 12. An arcuate shaped "T" slide 31 is formed in each end 30 of each rotor 14. The "T" slide 31 is provided with at least one mounting ear 32 which allows the rotor 14 to be slidingly attached to an oppositely disposed receiving arcuate shaped "T" slot 35 formed between the protruding retainer cap rails 34 on the outer ring 28 of the carousel 12. The opposite side of the carousel 12, including the arcuate shaped "T" slots 35, is shown in FIG. 10. A releasable pawl 33 is formed in each rotor end 30 to lock the rotor onto the carousel 12 after installation.

As seen in FIGS. 17 and 18, the distal end 36 of each rotor 14 includes an aperture 38 located opposite the end 30 and integral to the generally cylindrical end 40 of the arm 14. The aperture 38 is of a size and shape compatible to receive and co-axially support a corresponding mated lateral extending axle snap pin 42 attached to each feed receptacle 44.

Now referring to FIGS. 1 through 4, 19 and 20, the individual feeder stations 16 may be of any size and shape appropriate for the types or species of birds to be attracted, the overall size of the device 10, and the aesthetic desires of the user. In the preferred embodiment, the feeding stations 16 include generally rectangular feed receptacle 44 and a roof-like structure 48. The edge 50 of the receptacle 44 may include a rolled perch 52 that provides added strength and rigidity to the receptacle. The rolled perch 52 provides a better grip for feeding birds as their claws may easily grasp its contour for a more comfortable feeding position. Further, the bottom surface 56 of the receptacle 44 may be supplied with perforations 70 to provide drainage and circulation, thus preventing spoilage of feed.

Figures 5, 6:
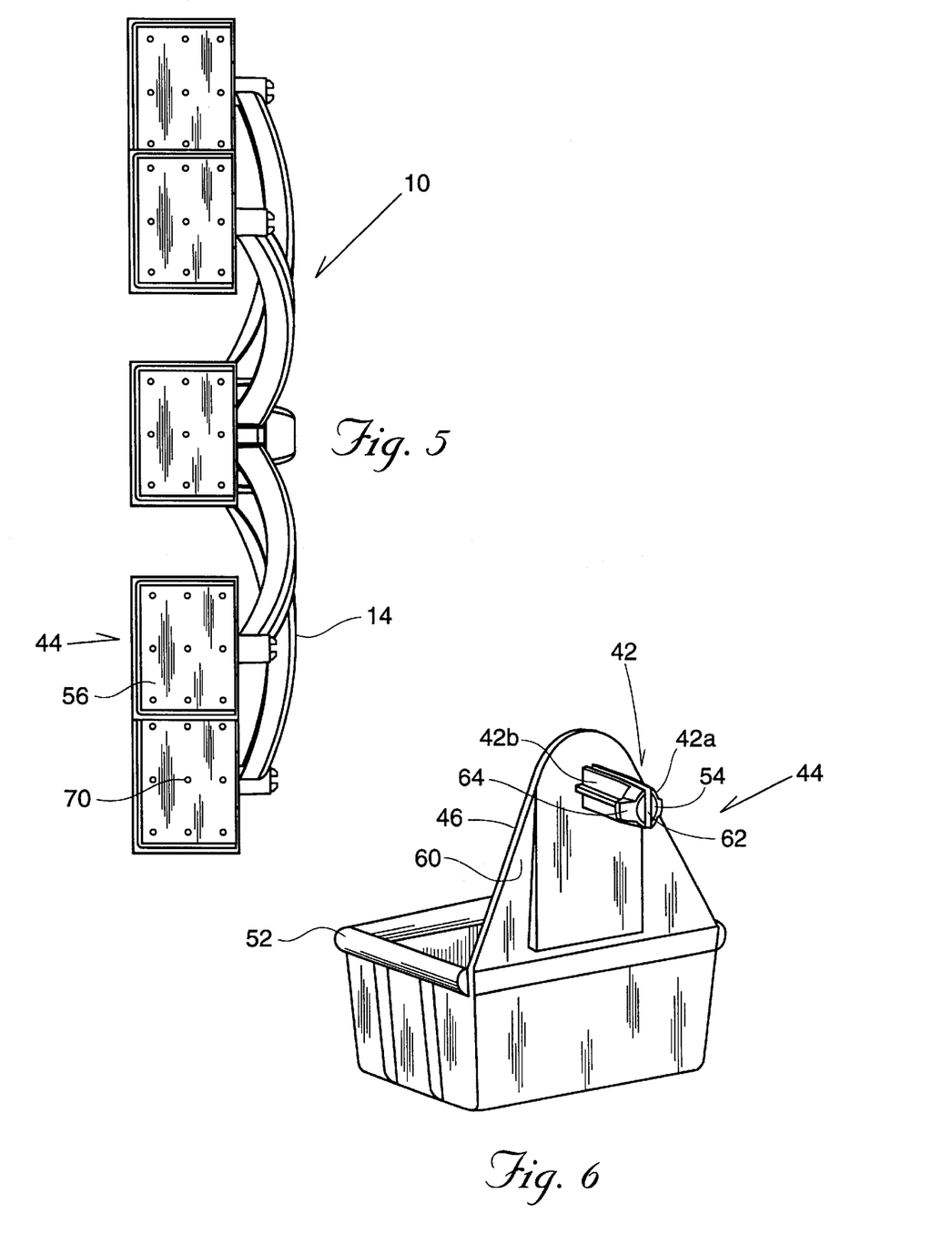
FIG. 5 is a bottom plan view of the bird feeder device including feed receptacle weep holes.
FIG. 6 is an enlarged rear perspective view of a feed receptacle showing the bifurcated axle snap pin with radial flange.
Figure 7:
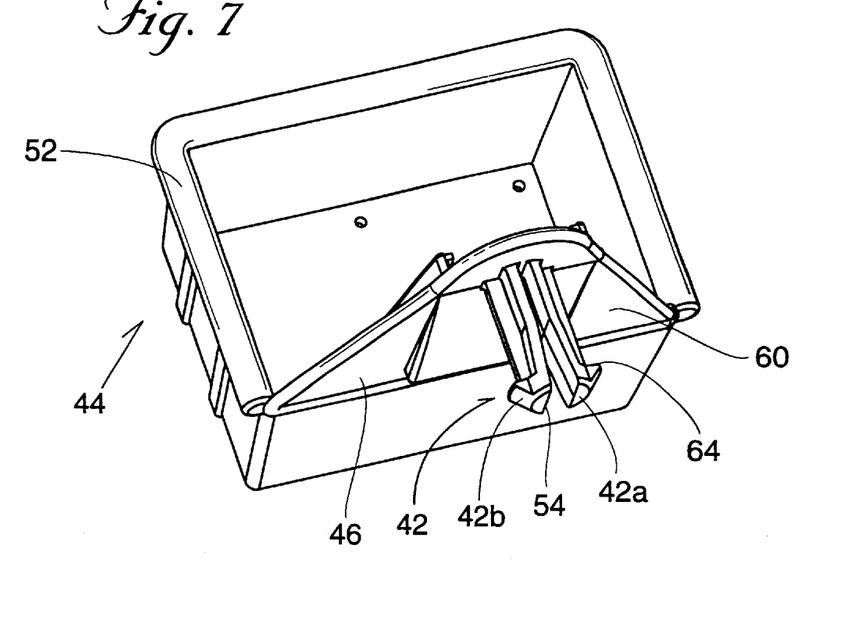
FIG. 7 is an enlarged top perspective view of the feed receptacle showing the bifurcated axle snap pin with radial flange.
Figure 8:
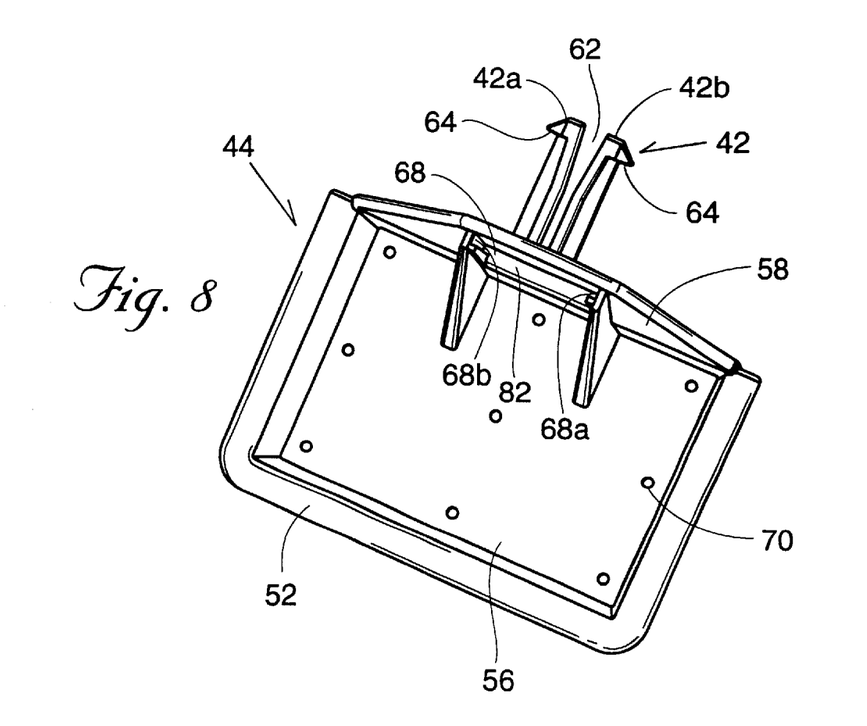
FIG. 8 is another enlarged top perspective view of the feed receptacle again showing the bifurcated axle snap pin with radial flange.
Figure 9:
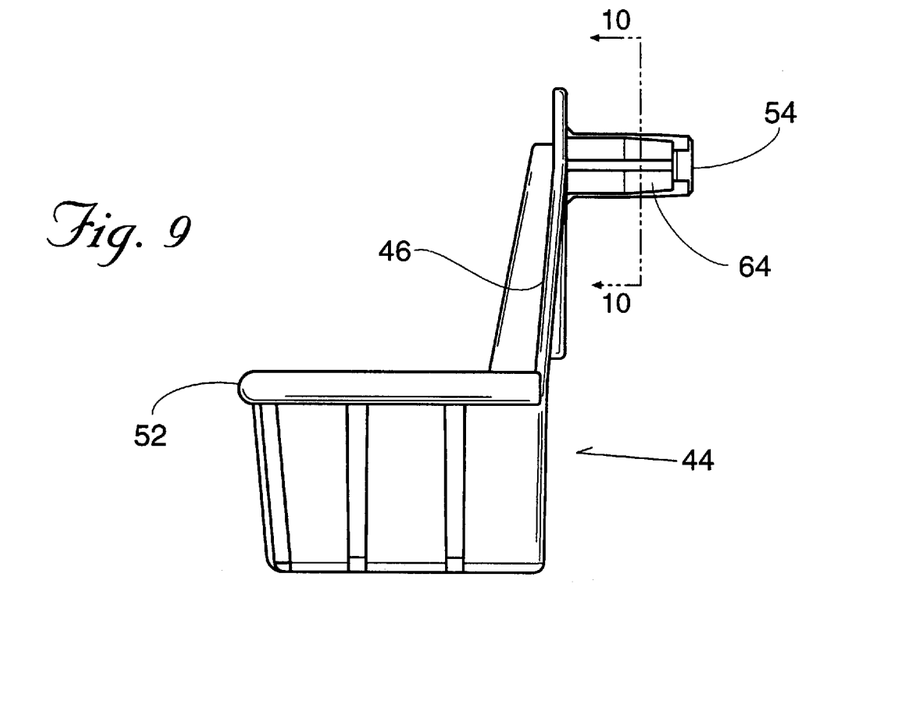
FIG. 9 is a side elevational view of the feed receptacle.

The feed receptacle 44 also includes a vertically : extending back support surface 46. Referring to FIGS. 6 through 9 and 12 through 15, the vertically extending back support surface 46 is preferably integrally molded to the feed receptacle 44 and includes a front 58 and a back 60. The support surface 46 extends vertically from the receptacle 44 and provides the attachment means for the optional roof-like structure 48 desired to be attached thereon. With particular reference to FIGS. 6 through 9, the back 60 of the support surface 46 is integrally molded to further provide a longitudinally extending, bifurcated, axle snap pin 42. The axle snap pin 42 defines a longitudinal slot 62 defined by the bifurcated members, 42a, 42b. The bifurcated members 42a and 42b pass through the aperture 38 to circumferentially engage the aperture 38 in rotor 14. A cross sectional view of the pin 42 is shown in FIG. 10. With reference to FIGS. 6, 7 and 8 it can be seen that the distal end 54 of the axle snap pin 42 is provided with a snap retainer flange 64 that, once through the aperture 38, resists removal.

Figure 11:
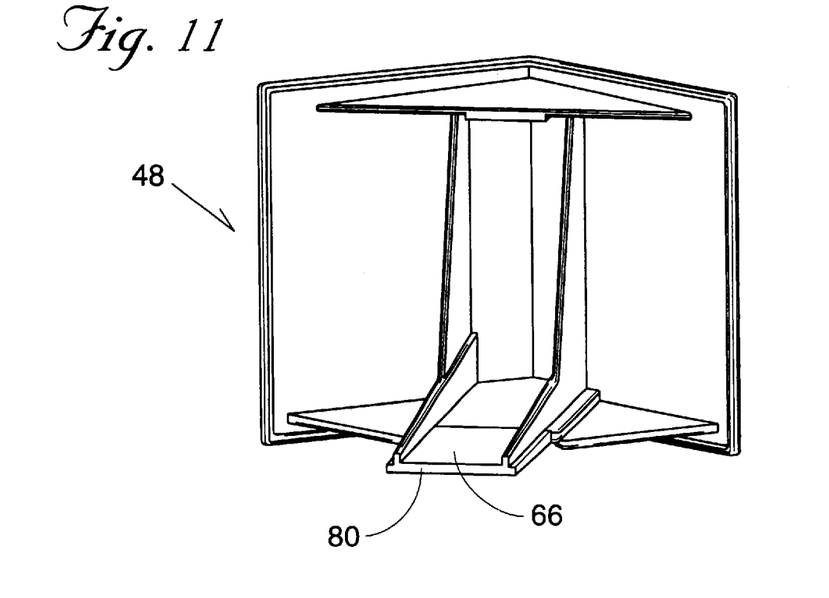
FIG. 11 is a bottom perspective view of the roof-like structure.
Figure 12:
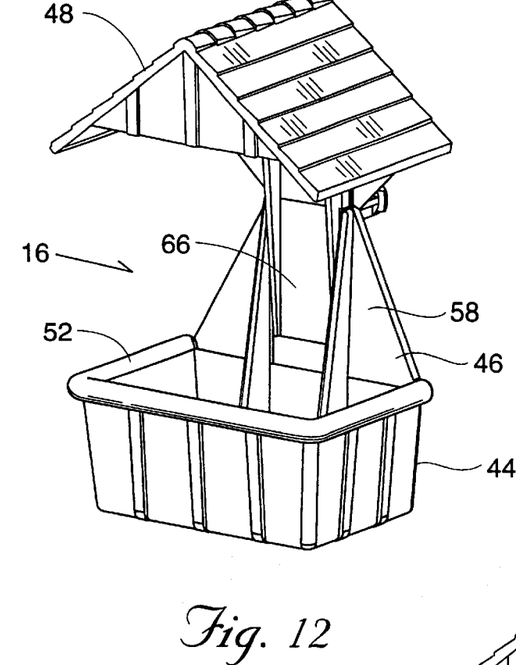
FIG. 12 is a front perspective view of the feeder station.
Figure 13:
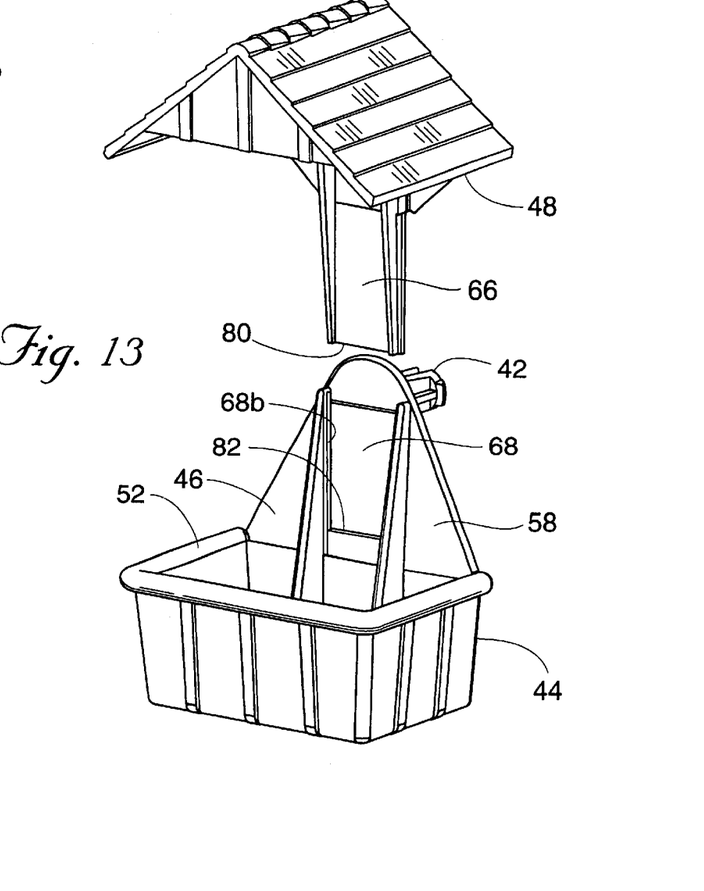
FIG. 13 is a front perspective view of the feeder station in an exploded condition.
Figure 14:
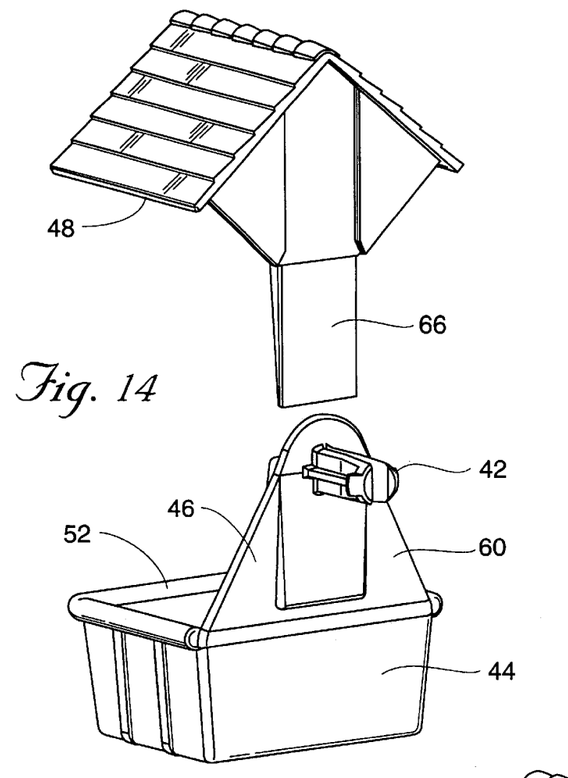
FIG. 14 is a rear perspective view of the feeder station in an exploded condition.
Figure 15:
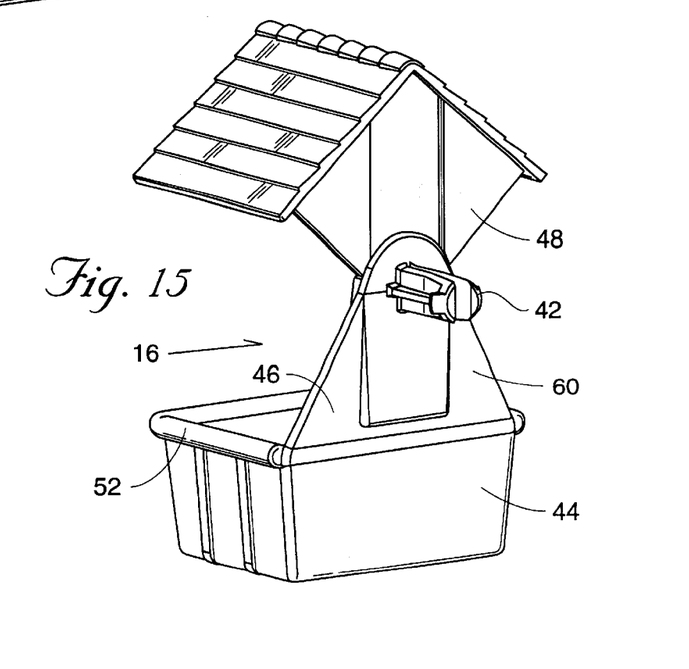
FIG. 15 is a rear perspective view of the feeder station.
Figure 16:
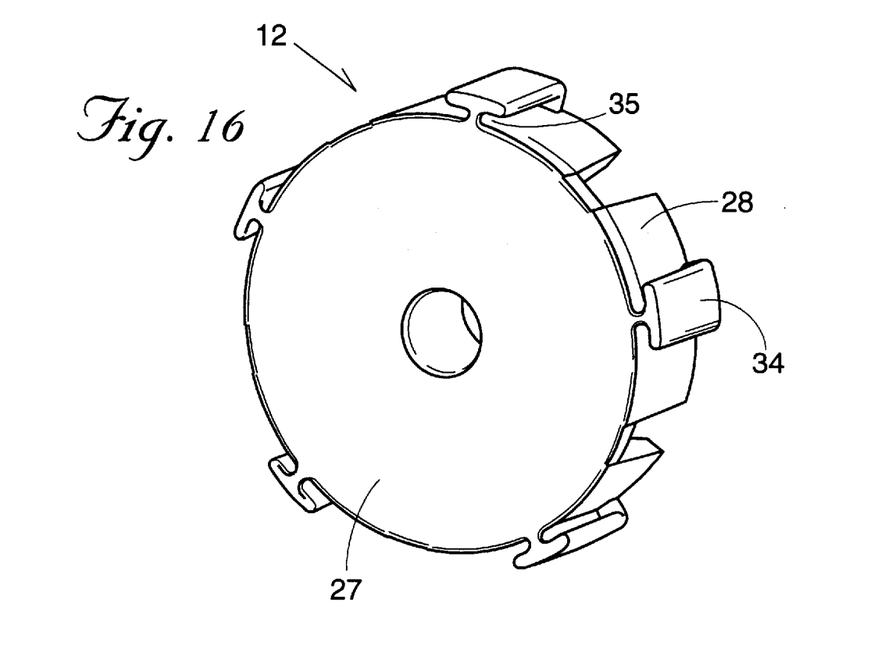
FIG. 16 is a rear perspective view of the vertical structural carousel

As best seen in FIGS. 1 and 20-, each feed receptacle 44 may be further provided with an interlocking roof-like structure 48. As shown in FIGS. 11,13 and 14, the roof-like structure 48 includes a downwardly extending attachment tongue 66. Now referring to FIGS. 8 and 13, tongue 66 slides into and frictionally engages with the vertically extending channel pocket 68 defined by the supporting webs 68a and 68b in the front surface 58 of the support surface 46 of the feed receptacle 44 creating a tapered lock fit. When the tongue 66 is fully inserted into the channel pocket 68, the lower edge 80 of roof-like structure 48 is in substantial contact with the lower surface 82 in pocket 68 of feed receptacle 44. An assembled feed receptacle 44 and roof-like structure 48 forms the feeder station 16 shown in FIGS. 12 and 15.

The roof-like structure 48 is preferably injection molded plastic and may be molded with or without shingles or other patterns on the surface.

To be pleasingly aesthetic, a variety of surface configurations may be applied to the feed receptacles 44 and roof-like structures 48. As shown in the drawings, vertical batten boards may be formed in each receptacle. Shingle configurations may be formed in the roof structure. It is to be understood that these features are aesthetic only and are not meant to limit or narrow the scope of the present invention. While exemplary configurations have been shown, countless other configurations exist and could be applied to each component without deviating from the scope of the invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A bird feeder device for support on an axis comprising:
   a vertical structural carousel, said. carousel being rotatably supported on said axis in a substantially vertical plane;
   a plurality of support rotors each having a proximal end and a distal end, said proximal end being conjoined with said carousel;
   each of said rotors being circumferentially spaced from one another and respectively terminating in free and unrestrained distal ends; and
   a plurality of feed receptacles, each of said receptacles being. pivotally attached to the distal end of a respective one said rotors.

2. The bird feeder device of claim 1, wherein said rotors are arranged for releasable engagement with said carousel.

3. The bird feeder device of claim 1, wherein said feed receptacles further include a roof-like structure.

4. The bird feeder device of claim 3, wherein, said roof-like structure is attached to said feed receptacle with a friction fit.

5. A bird feeder device of claim 4, wherein said feed receptacle includes a vertically extending channel pocket including an upwardly facing entrance opening, and said roof-like structure including a downwardly extending attachment tongue arranged to frictionally mate with and to be slidably and releasably received within said channel.

6. The bird feeder device of claim 1, wherein at least one of said feed receptacles includes at least one drainage aperture.

7. A bird feeder device of claim. 1, wherein the carousel includes a central aperture rotatably supported on said axis and having a plurality of circumferentially spaced "T" slots, and said proximal ends of respective support rotors being arranged to frictionally mate with and to be slidably and releasably received within said "T" slots.

8. A bird feeder device for support on an axis comprising:
   a vertical structural carousel, said carousel being rotatably supported on said axis;
   a plurality of support rotors radially extending from said carousel;
   each said rotor having a distal end;
   a plurality of feed receptacles, each of said receptacles being pivotally attached to the distal end of a respective one said rotors; and
   wherein the pivoted attachment of each said feed receptacle to its respective rotor comprises a laterally extending, bifurcated axle snap pin defining a longitudinal slot and a radial flange at its distal end, and said distal end of said rotor including an aperture having one end thereof arranged to receive said axle snap pin, the slotted end flange extending outwardly from the opposite end of said aperture to provide a circumferential engagement therewith.

* * * * *